Patented Mar. 7, 1939

2,149,661

UNITED STATES PATENT OFFICE 2,149,661

MINERAL OIL SULPHONATES

Robert Louis Brandt, New York, N. Y., assignor to Colgate-Palmolive-Peet Company, Jersey City, N. J., a corporation of Delaware No Drawing. Application December 21, 1936, Serial No. 117,096

19 Claims. (Cl. 260—504)

This invention relates to certain new chemical compositions. The new compositions may be generally described as products or the salts of products of the reaction of sulphonating agents upon certain solvent extracts of mineral oils. The products are particularly useful as deterging, wetting, foaming, frothing or emulsifying agents and, in general, as modifiers of capillary action and of surface tension. They are highly useful as textile assistants.

The possibility of using petroleum oils as a source of raw materials from which to prepare the so-called sulphonic acids and their salts has long been considered and is the subject of numerous patents. For example, Ludwig Otto Helmers in U. S. Patent 525,784, granted September 11, 1894, describes the treatment of mineral oils with sulphuric acid to produce sulphonic acids, and Robert T. Osborn and a co-inventor in U. S. Patent 1,955,859, granted April 24, 1934, describe the treatment of a sulphur dioxide extract of mineral oil, also to produce sulphonic acids. Further, an English patent, No. 346,945, specifies the treatment of motor oil with sulphur trioxide or other sulphonating agent in the presence of liquid sulphur dioxide.

Thus, in many instances and in many ways, prior to this invention, mineral oils and sulphuric acid have been placed in contact and have to a greater or less extent been reacted together, but insofar as the present inventor has been able to determine none of these products made according to the prior art has been entirely satisfactory for practical use as a deterging, wetting, emulsifying, or foaming agent or the like.

According to this invention, a method is provided by which acid reaction products of far greater purity and of high effectiveness for the purposes mentioned, may be produced from mineral oils. Though it is to be understood that any mineral oil distillate may be used in this process it is preferred to employ a so-called naphthene base crude, such as is obtained from the Texas Gulf crudes, as distinguished from, say, Pennsylvania crudes and particularly such distillates as contain a considerable proportion of constituents extractable with liquid sulphur dioxide, prominent among these being unsaturated hydrocarbons. It has been found that the lower viscosity oils are, in general, to be desired.

The first step in the new process is an extraction of the mineral oil to be used, with liquid sulphur dioxide, liquid sulphur dioxide plus benzol, or other preferential solvent, such as furfural, phenol, nitrobenzene, propane-cresylic acid mixtures, or the like. This operation yields a hydrocarbon oil extract which is characterized by high specific gravity in comparison to the starting oil, extremely low viscosity index, high Conradson carbon, and a high degree of unsaturation. It is generally thought that these extracts are composed of the more unsaturated and aromatic of the hydrocarbons constituting the original oil. In general, repeated extractions of the same oil will yield additional extract, but the extract so obtained is not quite so satisfactory for the present purposes as the extracts obtained by less exhaustive extraction. All of these extracted materials no matter by what solvent obtained, in order to be suitable for use in this invention should be completely soluble or practically so in liquid sulphur dioxide.

The next step in the process consists in dissolving the extracted material in liquid sulphur dioxide, or the extracted material being already in sulphur dioxide solution from the solvent extraction process, the next step may consist in diluting the solution with as much more sulphur dioxide as may be necessary to prepare it for the subsequent steps in the process. Usually, the extracted material should be diluted with about twice its volume of liquid sulphur dioxide. The resulting solution of extracted material in liquid sulphur dioxide is, even at low temperatures (below 0° C.), very fluid and non-viscous.

Having the desired solution of extracted material in liquid sulphur dioxide, the solution is cooled and mixed with a sulphonating agent, such as fuming sulphuric acid, keeping the temperature quite low during the mixing. Where fuming sulphuric acid is the sulphonating agent employed it makes substantially a one-phase mixture, or solution, with the solution of extract in sulphur dioxide such as has been described. Preferably, the temperature will be kept below −5° C., during the mixing though some extracted materials from some crude oil sources may require or permit either higher or lower temperatures. Vigorous agitation should be used, especially where it is desirable to maintain a low temperature, which is more commonly the case, as the chemical reaction is accompanied with rapid generation of heat, and in the event a batch method is employed it has been found preferable to add the acid to the oil, instead of the reverse, since this permits closer temperature control.

The amount of acid used, and its strength, will depend on the type of extracted material and on the characteristics desired in the finished product. Acid that is too weak is not vigorous enough and requires a longer contact time with the extracted material and yields less desirable, dark colored finished products; acid that is too strong requires lower mixing temperatures, which in turn makes necessary longer contact time and may result in darkening the finished products, giving them an odor, and decreasing the yield. Fuming sulphuric acid (commercial 20% oleum), in a quantity about equal in weight to the extracted materials to be treated has been found satisfactory. Sulphur trioxide, chlorsulphonic acid or other sulphonating agent may also be used.

Upon completion of the original mixing of acid with the extracted materials and after the evolution of heat has substantially ceased, the reacting mixture will usually be raised to a temperature somewhat higher than that at which the original mixing took place, and the agitation continued for a sufficient length of time to complete the reaction. The original mixing will ordinarily be accomplished in a few minutes, after which the agitation will be continued for, say, an hour and a half or until the reaction has become completed and the heat generated in the solution has been completely absorbed by the cooling means.

The treatment with the sulphonating agent having been completed, the sulphur dioxide is removed by evaporation, preferably at or below the treating temperature, and is recovered, if desired. The remaining material is diluted with cold water, the temperature not being allowed to rise above about 20° C., and neutralized with a basic compound, such as caustic soda, soda ash, ammonia, triethanolamine, lime, or the like.

In order to prepare a finished product of the best quality it is preferred, either before or after the neutralization, to wash the product with a low boiling hydrocarbon solvent. A saturated gasoline, such as Pennsylvania grade, that is entirely volatile in the presence of steam at a temperature below that at which the final product is to be dried, is very satisfactory for this purpose, since it readily dissolves the undesired products and any that remains after separation is completely removed itself in the drying operation. It has been discovered that if the washing is performed before neutralization, certain difficulties due to the formation of emulsions are avoided and for that reason the step is best performed at that time.

When the materials extracted from petroleum oils, and not in solution in liquid sulphur dioxide, are treated with sulphuric acid, polymerization, oxidation, sulphonation, condensation and other types of reactions occur in greater or less degree, depending on the strength of acid, kind of oil, temperature, time, oil-acid volume relations and other factors. It has been found that in order to bring about the desired reaction with a minimum of side reactions, other factors being equal, time and temperature are of great importance. Thus, it is desirable to contact the acid and extracted material as rapidly as is possible without permitting local overheating or a rise in temperature above certain limits. After the acid and extracted material have been mixed it is desirable to continue the reaction for only so long a time as is necessary to form the desired products and then to get the products out of contact with the strong mineral acid as quickly as possible. Any excessive time of contact reflects in bad odor, poor color, lowered detersive and wetting out properties, and lower yields because of polymerization, oxidation, local overheating, and other objectionable reactions referred to above that are quite beyond control. In the present process, rapidity of contact and low operating temperature are permitted by the use of liquid sulphur dioxide as a solvent, and this same liquid sulphur dioxide in addition to acting as a solvent appears to assist the reaction in still another way, which is not understood, but may be generally designated as a catalytic effect of the liquid sulphur dioxide on the reaction between the extracted material and the sulphonating agent.

To illustrate the difficulty encountered in the practice of prior processes, when an Edeleanu extract from refined transformer oil was mechanically mixed with 102% sulphuric acid in the proportions of two parts of oil to one of acid, the viscosity of the mixture quickly became so very great as to preclude any possibility of forming a homogeneous mass. Not only this, but wide localized temperature variations occurred because the highly viscous and sticky sludge that formed owing to the absence of a mutual solvent and because of local overheating settled out on the walls of the mixing device and acted as a heat insulator and prevented proper cooling. With the mixture at 65° C., and the water circulating through the cooling jacket of the mixer at 6° C., the temperature of the mixture rose to 75° C., indicating the impracticability of temperature control under such circumstances. This result was obtained in spite of violent mechanical agitation and a large cooling surface.

In such a mixture as has just been described without the use of a mutual solvent for the extract and sulphonating agent there are evidently two phases present, one of which is relatively acid-soluble and the other of which is relatively acid-insoluble. As a consequence it is quite easy for the acid to contact with and act further than is desired upon the material that has already been reacted upon and is relatively acid-soluble, but it is extremely difficult to get the acid into intimate contact with the remaining material. The high viscosity adds to this difficulty and undesired side reactions and excessive localized temperature rises occur. As a result, the final product is obtained only in lower yields and is dark in color, of bad odor and of poor quality. Incidentally, the power required for mechanically mixing is far too high for efficient production.

Sulphonates of mineral oils, even though they appear, when dissolved in water, to be clear, may contain relatively large quantities of impurities. Thus a sodium sulphonate made from oil refinery sulphuric acid sludge was found to contain 20% of oil, in another case 8% and in still another 40%. In addition to oil the products may contain small amounts of undesirable side reaction products such as resins, polymerized hydrocarbons, coloring matter, oil soluble sulphonic acids, thio compounds and other materials that may be dark colored and/or malodorous and unstable. Many of these compounds are highly objectionable in the finished products, as they prevent or hinder detersive action, rapid wetting-out and rapid solubility. Furthermore, mineral oils in general are not completely and readily soluble in liquid sulphur dioxide as are the extracts towards which the present invention is particularly directed, and for this reason sulphonations performed on such oils as are not completely soluble in liquid sulphur dioxide or which are performed without the presence of a considerable proportion of liquid sulphur dioxide, are almost sure to yield products containing a considerable amount of objectionable unsulphonated oil which is apt to go into apparent solution, as illustrated above, and give a solution with poor efficiency and objectionable qualities. They are, in fact, the cause of stickiness when hand washing, of a slight yellow stain or color in washed goods, and of other unwanted characteristics. Similarly, sulphonates made by the present process may contain small percentages of such impurities, even though their aqueous dispersions are clear. This clarity is probably due to the hydrotropic properties of the water-soluble sulphonates, that is, their ability to emulsify water insoluble materials in water. However, even small quantities of impurities left in the final product may unfit it for many of the uses for which it is intended. The gasoline wash provided in the process described is for the purpose of removing these impurities.

In order to more fully explain and illustrate the details of the process by which the new materials are made, the following specific example is given:

The extracted material used was obtained by the Edeleanu process from a Texas Gulf Coast crude distillate of the naphthene-base type, having a Saybolt viscosity at 100° F. of about 100 seconds. One volume of the extracted material was dissolved in two volumes of liquid sulphur dioxide and cooled to —15° C. An amount of 20% commercial oleum equal in weight to the extracted material was added to the solution with vigorous agitation, the addition being made in about 5 minutes. The operation was performed in a jacketed autoclave, provided with a stirring device, thermometer and pressure gauge. Considerable evolution of heat occurred during and immediately after the addition of the acid. Temperature control was maintained by circulating a cooling fluid through the jacket and the temperature was at no time permitted to rise above —5° C. After the acid addition the temperature was allowed to rise to —5° C. and maintained at that point for about one and a half hours, the agitation being continued. At the end of this period the sulphur dioxide was separated as a vapor, by releasing the pressure at a temperature below —5° C.

To finish the preparation, the substantially sulphur dioxide-free material was mixed with twice its volume of ice-water, keeping the temperature below —20° C. There was a considerable amount of heat evolved at this step on account of the heat of dilution of the acids. After dilution, the aqueous solution or dispersion was immediately batch-washed three times with 20% of its volume of gasoline, all of which was volatile below 250° F. It was then neutralized with caustic soda and, finally, dried on soap-drying rolls at a roll temperature of 250° F.

The above operations yielded a substantially dry, fluffy powder just off-white in color, having no odor in the dry state. Aqueous solutions, when rubbed into a lather on the hands, give no odor. Dilute solutions of varying concentration ranged from a pale green tint to a very light yellow, were excellent foamers (comparing favorably with soap), excellent washing and detergent materials, and also powerful wetting-out and emulsifying agents.

Examples of use:—

A sample of raw wool, showing a 60% shrinkage when treated by conventional scouring methods, was scoured with an 0.8% aqueous solution of the above product at 110° F. (The product consisted of 50% by weight of active ingredient and 50% by weight of sodium sulphate formed in the neutralization.) The scouring was repeated using a 0.6% solution and finally with a 0.5% solution. The wool was then washed once with water at 120° F. and dried. The dried wool was considered clean, had no odor and showed 60% shrinkage. It contained 1.0% of wool grease as determined by ethyl ether extraction.

The detergency of the present material (containing 50% active ingredient) was compared to that of soap by washing samples of standard soil in a Launderometer. A concentration of 0.3% was used in each case and the water contained 300 P. P. M. of hardness. Ordinary fatty acid soaps showed little or no detersive properties. The product described above, however, showed good detergency. It foamed in hard water as well as in soft water and showed no tendency to cloud in hard water, except at very low concentrations.

A mixture of 85% pine oil and 15% water containing 0.5% of the product (50% active ingredient) was hand shaken until a cream-like emulsion was obtained. This emulsion showed no signs of breaking after six weeks standing at room temperature.

A 1% solution of this product (50% active ingredient) was compared with a similar concentration of sodium lauryl sulphate (50% active ingredient) for wetting-out time. For this purpose a ¾ inch square of canvas was dropped on the surface of each of the liquids and the time noted for complete immersion. The wetting-out time of this product was 5 seconds as compared with 12 seconds for the sodium lauryl sulphate.

Many uses for the new products other than those mentioned will become immediately apparent. To mention but a few possibilities, they are useful in the flotation of ores, in shampoos, in dye baths, and for many detergent purposes. They may be used either alone or in admixture with soaps and/or soap fillers, such as sodium silicate, bentonite, calcium carbonate, talc and pumice. The final products may take the form of powders, beads, bars, solutions, emulsions, creams or salves, or any other forms desired.

In this specification the term sulphonic acids has been used to mean the sulphuric acid reaction products in a general sense and not merely one class of chemical compounds.

I claim:

1. A composition of matter characterized by its ability to act as a detergent and as a wetting agent in aqueous solutions, by a substantial absence of color and odor, both in its dry form and in aqueous solution, and by the fact that its aqueous solutions do not stain fabrics, said composition being preparable by solvent extracting mineral oil with a preferential solvent that tends to dissolve certain constituents of the oil and not to dissolve others, the constituents which the solvent tends to dissolve being generally those of an unsaturated nature, including those of aromatic nature, and thereafter treating the material extracted, while in solution in liquid sulphur dioxide with a sulphonating agent.

2. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting naphthene base crude mineral oil distillate with a preferential solvent that tends to dissolve certain constituents of the oil and not to dissolve others, the constituents which the solvent tends to dissolve being generally those of an unsaturated nature, including those of aromatic nature, and thereafter treating the material extracted, while in solution in liquid sulphur dioxide, with a sulphonating agent.

3. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent that tends to dissolve certain constituents of the oil and not to dissolve others, the constituents which the solvent tends to dissolve being generally those of an unsaturated nature, including those of aromatic nature, and thereafter treating the material extracted while in solution in liquid sulphur dioxide, with a sulphonating agent at a temperature of not to exceed +5° C.

4. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent that tends to dissolve certain constituents of the oil and not to dissolve others, the constituents which the solvent tends to dissolve being generally those of an unsaturated nature, including those of aromatic nature, thereafter treating the material extracted, while in solution in liquid sulphur dioxide, with a sulphonating agent, and neutralizing the product that results.

5. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent that tends to dissolve certain constituents of the oil and not to dissolve others, the constituents which the solvent tends to dissolve being generally those of an unsaturated nature, including those of aromatic nature, thereafter treating the material extracted, while in solution in liquid sulphur dioxide, with a sulphonating agent, and washing the product with a substantially saturated hydrocarbon, substantially all of which volatilizes below 250° F.

6. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a liquid consisting essentially of sulphur dioxide which tends to dissolve certain constituents of the oil and not to dissolve others, the constituents which the liquid sulphur dioxide tends to dissolve being generally those of an unsaturated nature, including those of aromatic nature, and thereafter treating the material extracted while in solution in liquid sulphur dioxide with a sulphonating agent.

7. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent which tends to dissolve certain constituents of the oil and not to dissolve others, the constituents that the solvent tends to dissolve being generally those of an unsaturated nature, including those of aromatic nature, and thereafter treating the material extracted, while in solution in liquid sulphur dioxide with 20% oleum in a quantity about equal in weight to that of the extracted material.

8. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent which tends to dissolve certain constituents of the oil and not to dissolve others, the constituents which the solvent tends to dissolve being generally those of an unsaturated nature, including those of aromatic nature, and thereafter treating the material extracted, while in solution in about twice its volume of liquid sulphur dioxide, with a sulphonating agent.

9. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting a naphthene base crude mineral oil distillate with liquid sulphur dioxide which tends to dissolve certain constituents of the oil and not to dissolve others, the constituents which the liquid sulphur dioxide tends to dissolve being generally those of an unsaturated nature, including those of aromatic nature, thereafter treating the material extracted while in solution in approximately twice its volume of liquid sulphur dioxide and at a temperature of less than 5° C. with 20% oleum in an amount about equal in weight to that of the extracted material, for a period not exceeding three hours, maintaining vigorous agitation during the sulphonation, at the end of the sulphonation period diluting the sulphonated material with cold water, allowing the sulphur dioxide to escape from the liquid, washing the liquid with a substantially saturated hydrocarbon, substantially all of which boils below 250° F., neutralizing the washed liquid and evaporating the water and residual hydrocarbon from the remaining liquid.

10. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with furfural which tends to dissolve certain constituents of the oil and not to dissolve others, the constituents which the furfural tends to dissolve being generally those of an unsaturated nature, including those of aromatic nature, and thereafter treating the material extracted while in solution in liquid sulphur dioxide with a sulphonating agent.

11. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oils with phenol which tends to dissolve certain constituents of the oil and not to dissolve others, the constituents which the phenol tends to dissolve being generally those of an unsaturated nature, including those of aromatic nature, and thereafter treating the material extracted while in solution in liquid sulphur dioxide with a sulphonating agent.

12. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with liquid sulphur dioxide and benzol which tend to dissolve certain constituents of the oil and not to dissolve others, the constituents which the liquid sulphur dioxide and benzol tend to dissolve being generally those of an unsaturated nature, including those of aromatic nature, and thereafter treating the material extracted while in solution in liquid sulphur dioxide with a sulphonating agent.

13. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent which tends to dissolve certain constituents of the oil and not to dissolve others, the constituents that the solvent tends to dissolve being generally those of an unsaturated nature, including those of aromatic nature, and thereafter treating the material extracted, while in solution in liquid sulphur dioxide, with oleum.

14. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent that tends to dissolve certain constituents of the oil and not to dissolve others, the constituents which the solvent tends to dissolve being generally those of an unsaturated nature, including those of aromatic nature, and thereafter treating the material extracted, while in solution in liquid sulphur dioxide, with a sulphonating agent at a temperature of not to exceed −5° C.

15. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent that tends to dissolve certain constituents of the oil and not to dissolve others, the constituents which the solvent tends to dissolve being generally those of an unsaturated nature, including those of aromatic nature, thereafter treating the material extracted, while in solution in liquid sulphur dioxide, with a sulphonating agent, and washing the product with a substantially saturated gasoline, substantially all of which volatilizes below 250° F.

16. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent that dissolves certain constituents of the oil and does not dissolve others, the constituents which the solvent dissolves being generally those of an unsaturated nature, including those of aromatic nature, and thereafter treating the material extracted, while in solution in liquid sulphur dioxide, with a sulphonating agent, for a period of three hours or less.

17. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting naphthene base crude mineral distillate with liquid sulphur dioxide which tends to dissolve certain constituents of the oil and not to dissolve others, the constituents which the liquid sulphur dioxide tends to dissolve being generally those of an unsaturated nature, including those of aromatic nature, and thereafter treating the material extracted while in solution in liquid sulphur dioxide with a sulphonating agent.

18. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent which tends to dissolve certain constituents of the oil and not to dissolve others, the constituents which the solvent tends to dissolve being generally those of an unsaturated nature, including those of aromatic nature, and thereafter treating the material extracted, while in solution in about twice its volume of liquid sulphur dioxide, with 20% oleum in a quantity about equal in weight to the extracted material.

19. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by solvent extracting mineral oil with a preferential solvent which tends to dissolve certain constituents of the oil and not to dissolve others, the constituents which the solvent tends to dissolve being generally those of an unsaturated nature, including those of aromatic nature, and thereafter treating the material extracted, while in solution in about twice its volume of liquid sulphur dioxide, with 20% oleum in a quantity about equal in weight to the extracted material, at a temperature of not to exceed +5° C.

ROBERT LOUIS BRANDT.

Certificate of Correction

Patent No. 2,149,661. March 7, 1939.

ROBERT LOUIS BRANDT

It is hereby certified that errors appear in the printed specification of the above numbered patent requiring correction as follows: Page 1, second column, line 41, after the word "mixing" insert a comma; page 3, first column, lines 43 and 48 respectively, for "$-5°$ C." read $+5°$ C.; line 52, for "$-20°$ C." read $+20°$ C.; page 5, first column, line 8, claim 11, for "oils" read *oil*; and that the said Letters Patent should be read with these corrections therein that the same may conform to the record of the case in the Patent Office.

Signed and sealed this 25th day of April, A. D. 1939.

[SEAL] Henry Van Arsdale

*Acting Commissioner of Patents.*